United States Patent [19]

Worcester

[11] 4,201,079
[45] * May 6, 1980

[54] REMOTE FLOW TRANSDUCER FOR COMMUNICATION CABLE

[75] Inventor: Leslie Worcester, Los Altos, Calif.

[73] Assignee: Mark Telephone Products, Inc., Mountain View, Calif.

[*] Notice: The portion of the term of this patent subsequent to Feb. 15, 1994, has been disclaimed.

[21] Appl. No.: 727,746

[22] Filed: Sep. 29, 1976

Related U.S. Application Data

[63] Continuation of Ser. No. 520,192, Nov. 1, 1974, Pat. No. 4,007,628.

[51] Int. Cl.² .................. G01M 3/28; G01F 1/22
[52] U.S. Cl. ........................ 73/40.5 R; 73/210
[58] Field of Search ............ 73/40, 40.5 R, 114, 73/207, 208, 209, 210, 262, 269, 279, DIG. 11; 92/5 R; 116/114 PV; 250/215

[56] References Cited

U.S. PATENT DOCUMENTS

| | | | |
|---|---|---|---|
| 2,273,331 | 2/1942 | Rowerdink | 73/210 |
| 2,455,532 | 12/1948 | Sunstein | 73/DIG. 11 X |
| 3,268,867 | 8/1966 | Pickett et al. | 340/310 R X |
| 3,287,971 | 11/1966 | Bahniuk | 73/210 |
| 3,593,575 | 7/1971 | Thieme | 73/207 X |
| 3,628,024 | 12/1971 | Ciemochowski | 250/215 |
| 3,689,908 | 9/1972 | Ray | 73/209 X |
| 3,889,535 | 6/1975 | Bull et al. | 73/208 |

*Primary Examiner*—Charles A. Ruehl
*Attorney, Agent, or Firm*—Townsend and Townsend

[57] ABSTRACT

A method and apparatus for remotely monitoring air leakage in communication cables is disclosed. Improved volume flow meters are remotely attached at the air inlet to manhole mounted manifolds for supply of dehumidified air to telephone cables. Dehumidified air passes through the remote meters into the manifolds and then interior of a sheath of a communication cable wherein the discrete conduits can be kept dry and under air pressure. The remote volume flow meter at each manifold includes a diaphragm having an air flow conduit mounted in movable opposition to a variable area orifice. The diaphragm actuates a variable resistor, which preferably includes a tailored neutral density wedge. This tailored neutral density wedge moves with the diaphragm towards and away from a position between a light source (typically a light-emitting diode) and a photo sensor (typically of the photo resistor variety). The volume flow meter receives its power through and also has its output communicated through a single pair of wires. Powering of the light source occurs through an alternating current path consisting of a transformer secondary and regulator. Monitoring of the photo sensor output occurs by coupling the photo sensor element in series with the transformer primary and bypassing the alternating current path with a capacitor shunt. As a result, a remotely located meter, when dialed or remotely sampled, can indicate by variable penetration of the neutral density wedge, a changing resistance which is directly related to diaphragm position, and hence flow through the meter. This signal from a remote manhole location can be monitored from a distant central monitoring station, such as a central telephone office. Through a network of such flow meters in combination with conventional pressure transducers, cable air leaks can be detected, rapidly measured as to their suspected severity, and located with improved precision for timely repair.

1 Claim, 6 Drawing Figures

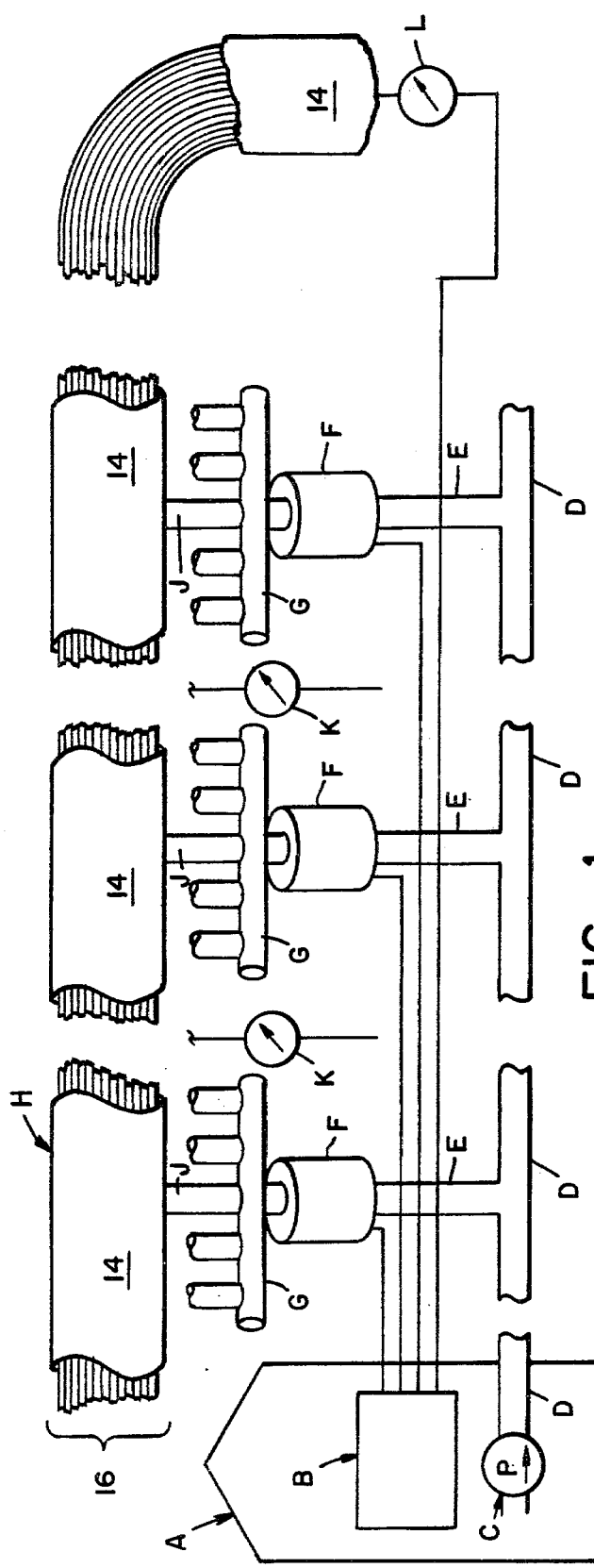
FIG_1
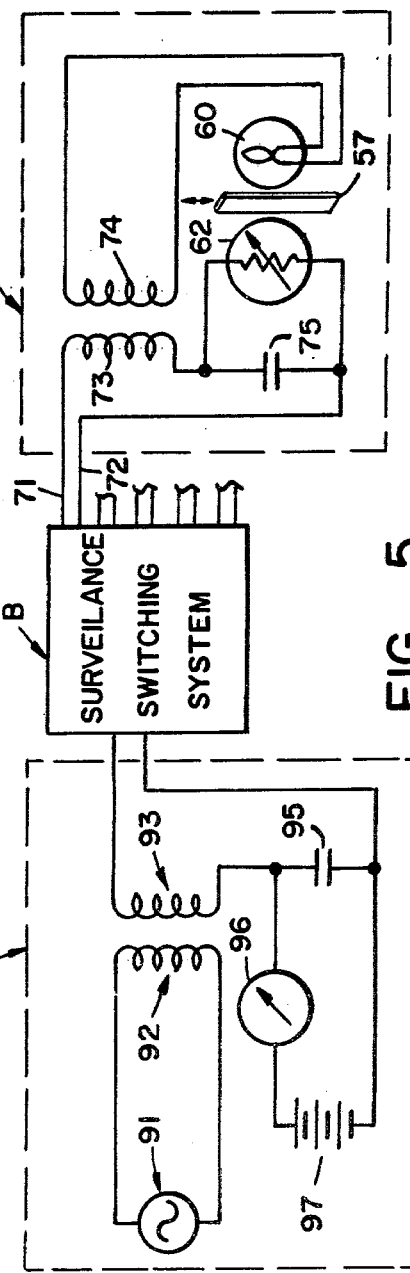
FIG_5

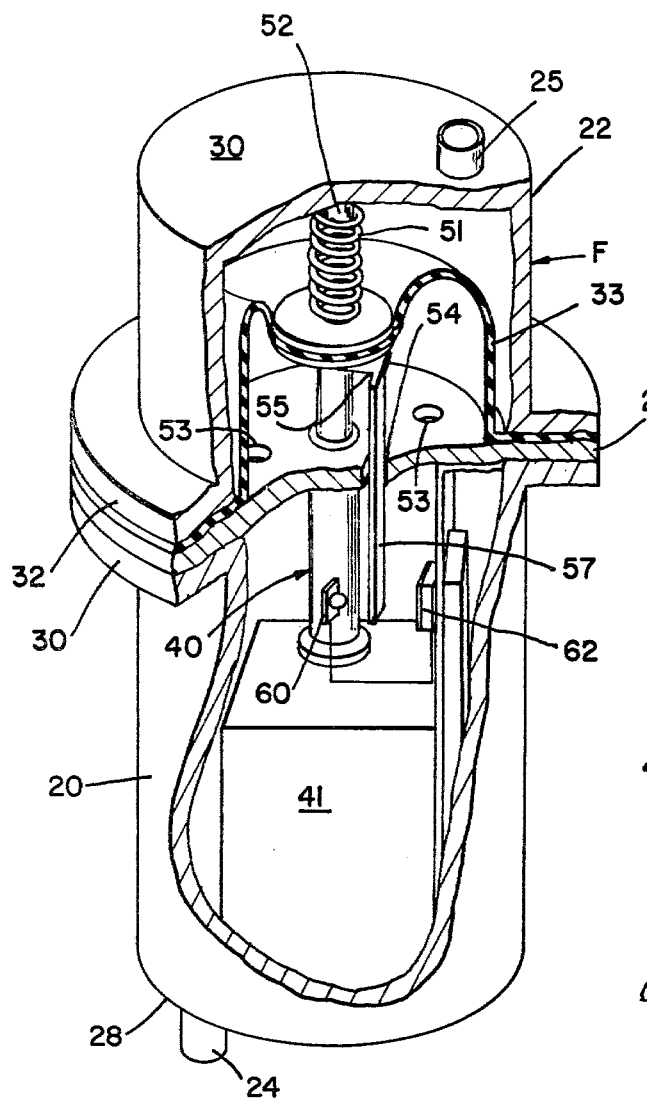
FIG_2
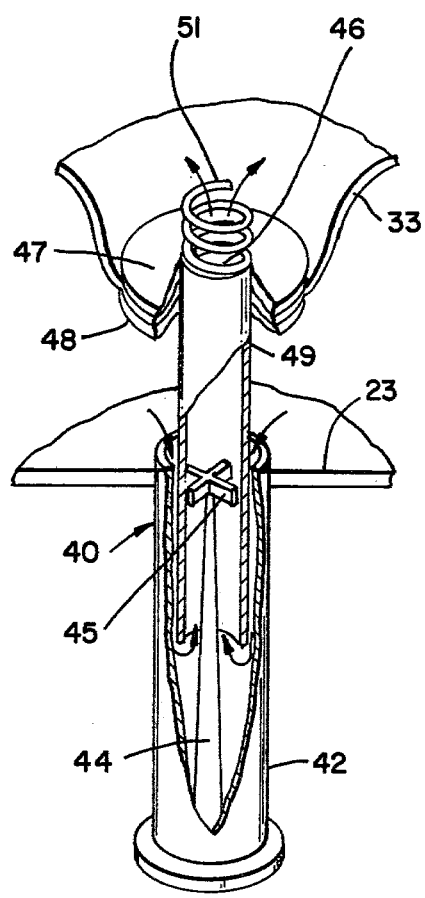
FIG_4
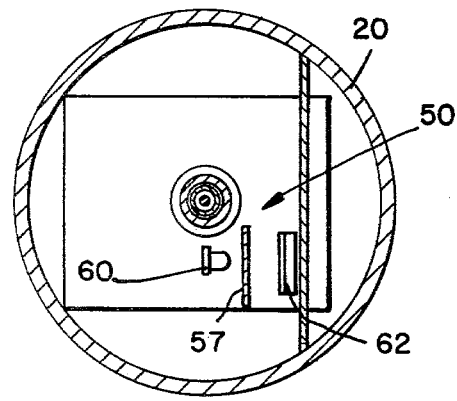
FIG_3

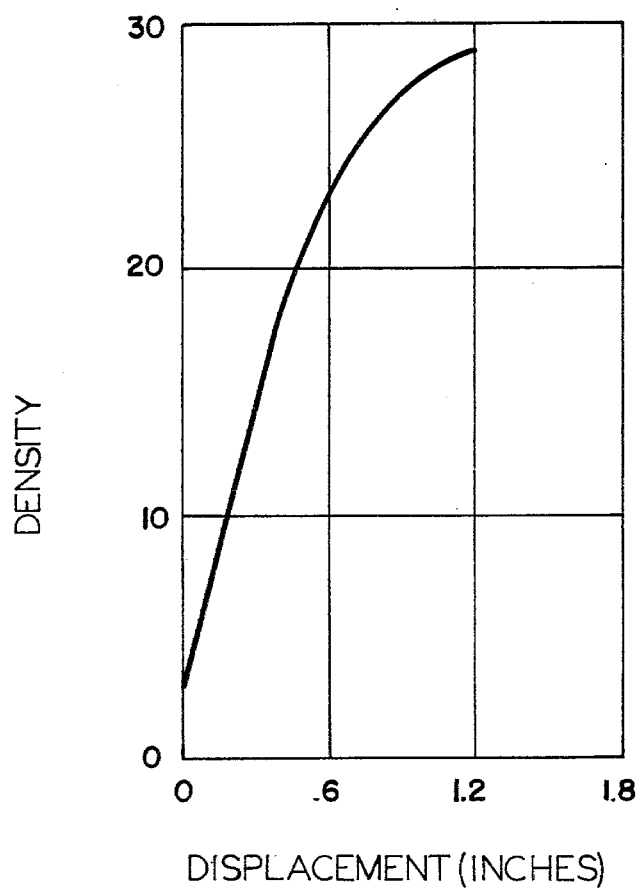
FIG_6

REMOTE FLOW TRANSDUCER FOR COMMUNICATION CABLE

This is a continuation of application Ser. No. 520,192, filed Nov. 1, 1974, now U.S. Pat. No. 4,007,628.

This invention relates to air flow meters and particularly to a remotely located air flow meter which is capable of being periodically monitored to indicate air flow.

STATEMENT OF PROBLEM

Communication conduits are individually bound together in sheathed cables. It is common for air to be communicated interior of the sheath of such cables. This air has about two percent humidity and is introduced into the cable sheath at about ten pounds pressure. This air serves to maintain the individual conduits in a dry condition. Additionally, if leaks occur in the cable sheath, the outward passage of air prevents the inward penetration of water interior of the cable. Moreover, where the leak in the sheath can be located, the potential point of entry of moisture can be patched and the dry and dehumidified air ambient interior of the individual communication conduits within the cable preserved.

It should be noted that cables are provided with numerous patched places, especially where individual conduits are threaded through the cable sheath to and from a major cable or trunk line. Moreover, cables are cross-conducted by "stubbing". At these locations, air can flow out of the cable sheath and can cross-flow between cables.

SUMMARY OF THE PRIOR ART

Heretofore, pressure only has been remotely measured in such cable systems. Typically, pressure has been measured in half pound increments remotely on a zero to ten pounds per square inch scale.

An example of a typical prior art system includes a single manifold having five outlets, each pressurizing an individual cable sheath enclosing 1200 and 2600 pairs of wires. Heretofore, each of these cables has been remotely measured with pressure transducers. Typically, the pressure transducers are placed at 5,000 foot intervals preferably located exactly between manifolds.

When an air leak occurs, typically more air is bled into the system. Often, this results in substantially the same pressure being maintained in the line in the area of the remote pressure transducer. This pressure is maintained until the line leakage exceeds the capacity of the system to supply dehumidified air at which point the pressure drops, moisture penetrates and communication is lost.

Moreover, the precise location of sheath leaks in cable systems has been extremely difficult to detect. Where a leak occurs at or near a manifold and remote from an intermediate pressure transducer, a high volume flow of air results with a low pressure drop at the pressure transducer. Moreover, when a puncture of a cable sheath occurs, a period of time elapses during which the cable sheath deflates. This deflation takes time. The result is that the location of leaks is slow. Moreover, the demoisturizing pressure of dehumidified air is lost before the severity of the cable sheath puncture is discovered. Before the severity of a sheath puncture can be evaluated and overtime judgments properly made by maintenance personnel, interruption of communication results.

Attempts have been made to meter air flow. Heretofore, the meterings have occurred adjacent the pump at a central dehumidifying station. Metering at this location can only grossly evaluate an entire cable region and is of little or no help in locating or evaluating with precision cable sheath punctures.

Metering at the individual manholes in which air flow manifold and conduit are located has also occurred. Typically, technicians are sent to individual manhole, required to open them, read the meters, and then proceed to adjacent manholes. Considerable time is used. Readings from one manhole to another are often confused. The end result is that individual sheath leaks cannot be satisfactorily located within a sufficient time interval to permit economic repair.

SUMMARY OF THE INVENTION

A method and apparatus for remotely monitoring air leakage in communication cables is disclosed. Improved volume flow meters are remotely attached at the air inlet to manhold mounted manifolds for supply of dehumidified air to telephone cables. Dehumidified air passes through the remote meters into the manifolds and then interior of a sheath of a communication cable wherein the discrete conduits can be kept dry and under air pressure. The remote volume flow meter at each manifold includes a diaphragm having an air flow conduit mounted in movable opposition to a variable area orifice. The diaphragm actuates a variable resistor which preferably includes a tailored neutral density wedge. This tailored neutral density wedge moves with the diaphragm towards and away from a position between a light source (typically a light-emitting diode) and a photo sensor (typically of the photo resistor variety). The volume flow meter receives its power through and also has its output communicated through a single pair of wires. Powering of the light source occurs through an alternating current path consisting of a transformer secondary and regulator. Monitoring of the photo sensor output occurs by coupling the photo sensor element in series with the transformer primary and bypassing the alternating current path with a capacitor shunt. As a result, a remotely located meter, when dialed or remotely sampled, can indicate by variable penetration of the neutral density wedge, a changing resistance which is directly related to diaphragm position, and hence flow through the meter. This signal from a remote manhole location can be monitored from a distant central monitoring station, such as a central telephone office. Through a network of such flow meters in combination with conventional pressure transducers, cable air leaks can be detected, rapidly measured as to their suspected severity, and located with improved precision for timely repair.

OBJECTS AND FEATURES OF THE INVENTION

An object of this invention is to place a meter sampled by remote dialing equipment, which meter can indicate flow at a manhole location distant from a central monitoring station, such as a central telephone office.

An advantage of this aspect of the invention is that changes of flow provide a more immediate indication of sheath puncture. The proximity of the leak can be detected with improved accuracy. Moreover, deflation of the cable sheath need not occur completely before corrective action is undertaken.

An additional advantage is that by a programmed sampling of a number of remote air flow devices, a relative change in flow can be detected. The severity of a leak in the cable sheath can be evaluated. Overtime judgment by maintenance supervisory personnel can be made with precision.

Yet another advantage of this invention is that the on site measurement of flow at remote manholes is no longer required.

Yet a further advantage of this invention is that "routining" or systematic reduction of sheath cable leaks in a given cable area can be remotely monitored. The performance of crews operating remotely from their supervisor can be more accurately judged.

Yet another advantage of this aspect of the invention is that the flow meter device can be used in conjunction with existent pressure monitoring equipment by combining the output of flow measurement with existent pressure measurement. Leak detection, location and evaluation is vastly improved.

Yet another advantage of this invention is that the number of monitored devices (whether they be pressure detectors or flow detectors in accordance with this invention) can be vastly reduced. Thus, cable conduits which were heretofore used for monitoring the cable sheath air system can be freed for revenue producing results.

A further object of this invention is to disclose a flow meter which provides for flow measurement with low pressure drop of dehumidified gas passing through to the meter. According to this aspect of the invention, each measurement device includes a diaphragm having an air flow conduit mounted in movable opposition to a variable area orifice. Low flow produces low orifice area. High flow produces high orifice area.

An advantage of this aspect of the invention is that the entire flow to a cable sheath manifold can be passed through the device.

Another advantage of the configuration of the variable orifice and diaphragm is that they are insensitive to vertical positioning of the flow meter. The flow meter can be placed at any alignment which is convenient to its installation; it is not required that it be placed in one position with respect to gravity.

Yet another advantage of the variable orifice and diaphragm is that the meter itself is capable of being designed to function as a check valve. Should pressure at the pump be lost, an air flow will occur from the cable toward the air pump. Air flow can be arrested at the meter.

A further object of this invention is to disclose a single two-wire circuit that simultaneously powers and monitors remote flow. Powering of the light source, typically a lightemitting diode, occurs through an alternating current path consisting of a transformer secondary and regulator. Metering of the photoconductive output occurs by coupling the photosensitive element in series with the transformer primary and bypassing the alternating current path with a capacitor shunt.

An advantage of this aspect of the invention is that each flow meter only uses a single pair of wires. Minimum use of lines results. The remaining communication conduits can be turned over to revenue generating communication.

An additional advantage of the monitoring circuit which results is that it can be used with remote sampling pressure sensing equipment. As it now exists, minimum modification to remote sampling equipment is necessary.

Yet another object of this invention is to disclose in combination with the diaphragm and variable flow orifice an electronic signal which, with substantial linearity, indicates detected flow. According to this aspect of the invention, a tailored neutral density wedge penetrates with diaphragm movement into the interstitial area between a light source and photo detector. The wedge, light source and detector are all contained internally of the meter.

An advantage of this aspect of the invention is that the wedge, light source and photo sensor are all contained in a dark, dry environment where maximum life with minimum interference from the operating ambient occurs.

An additional advantage of the neutral density wedge is that it can be tailored for virtually any non-linearity encountered in the system. For example, differing components of differing elasticity in the diaphragm or opposing spring can be accommodated by empirically determined wedge density changes.

Yet another advantage of this invention is that the device is completely enclosed. As such, it is substantially tamperproof. Maintenance personnel cannot alter the device to correspondingly alter evaluation of their performance.

Yet another advantage of this device is that tampering with air sheath systems in cables can be more immediately detected with the more immediately detectable change of flow.

Other objects, features and advantages of this invention will become more apparent after referring to the following specification and attached drawings in which:

FIG. 1 is a schematic view of three flow meters, three pressure sensors, and a single cable, all monitored from a central location which supplies dehumidified air;

FIG. 2 is a perspective view shown broken away illustrating the interior components of the improved remote sampled flow meter;

FIG. 3 is a section taken through the flow meter of FIG. 2 illustrating the relative positions of the light source, neutral density wedge and photo sensor;

FIG. 4 is an enlarged perspective of the variable area orifice shown broken away to illustrate the change of orifice area with meter diaphragm movement;

FIG. 5 is a schematic of the circuitry used for monitoring flow meter output, showing in the left-hand portion the telephone office circuitry, showing in the right-hand portion the circuitry in the meter, and illustrating schematically only conventional switching circuitry there between; and, FIG. 6 is a graph illustrating one embodiment of density versus displacement which is satisfactory for the construction of the neutral density wedge useful with this invention.

Referring to FIG. 1, central telephone exchange A is illustrated having monitoring equipment B and pump C supplying dehumidified air of two percent humidity under pressure to main outflow conduit D. Conduit D in turn flows to manifold conduit E through the improved remotely sampled flow meter F of this invention, and then to manifold G. It will be understood that conduit E, flow meter F, and manifold G are typically located within a manhole remote from the central exchange A.

It should be understood that monitoring equipment B is a known surveilance switching system. Specifically, the Cable Pressure Surveilance System manufactured by the Pacific Telephone Company of San Francisco, Calif. can be used with modification of those having ordinary skill in the art.

Dehumidified air supply to cable H is illustrated for only one cable. Typically, one of the outlets J from manifold G penetrates a cable sheath 14 containing typically 1200 to 2600 pairs of communication conduits 16. Dehumidified air under pressure is provided. For example, air would be communicated to cable H at 5,000 foot intervals.

It should be noted that the insulation in many underground cables is extremely moisture sensitive. For example, many cables are insulated by pulp or paper insulation of very small wall thickness.

It is preferable to monitor cable sheath pressure interior of sheath 14 for each cable H intermediate of the manifold connections at conduit J. To this end, conventional pressure transducers K are typically located intermediate the manifold G. Thus, the distance between the pressure monitoring transducers K will be approximately 5,000 feet.

Moreover, it is desirable to monitor, with a conventional pressure transducer L, the cable run at its remote end from the manifold. According to this aspect, a pressure monitor L is shown in the schematic of FIG. 1 at the end of a cable run.

Having set forth this much of the invention, the construction, and thereafter the operation of the flow measuring device, will be set forth with respect to FIGS. 2, 3, 4 and 6. Thereafter, an explanation of the circuitry monitoring the remotely located meters will be set forth with respect to FIG. 5.

Referring to FIG. 2, flow meter F includes a lower cylindrical portion 20 and an upper cylindrical portion 22, with a separating plate 23 captured there between. Lower cylindrical portion 20 is provided with an air inlet 24. Similarly, upper cylindrical portion 22 is provided with an air outlet 25. As can be seen, the lower section of cylindrical portion 20 and the upper section of cylindrical portion 22 are both closed with respective circular end walls 28, 30.

The respective cylindrical portions 20, 22 are confronted at annular flanges 30, 32. These flanges capture there between plate 23 and gasket material 33.

Gasket material 33 is shaped to a flexible bell shaped diaphragm form and extends upwardly of plate 23 into the interior volume defined by the cylindrical portion 22. It is the up and down movement of gasket 33 which simultaneously determines the variable area of the orifice assembly 40 (see FIG. 4) and the penetration of the neutral density wedge apparatus 50 (see FIG. 3).

The orifice assembly 40 is mounted on an interior pedestal 41. The closed end of cylinder portion 42 stands on pedestal 41. The open end of cylinder portion 42 extends upwardly to and preferably through plate 23 so as to communicate with air between plate 23 and the underside of the diaphragm material 33.

The closed cylindrical portion 42 of the orifice assembly 40 has concentrically mounted therein a tapered and preferably conical shaft 44 with a centering cross 45. As will hereinafter become more apparent, tapered shaft 44 provides a changing orifice area with elastic movement of the diaphragm 33.

Diaphragm 33 is apertured at an aperture 46 which is typically concentric. Aperture 46 is concentric of two diaphragm capturing disks 47, 48.

A cylinder 49, at both ends, communicates at its lower end to closed cylinder 42 and communicates at its upper end through aperture 46 in gasket 33. Preferably, gasket 33 is biased downwardly by a compression coil spring attached to the gasket capturing disks 47, 48 at the lower end of the coil spring, and to a concentric pall 52 at the upper end of the coil spring.

Ignoring for the present the function of the neutral density wedge apparatus 50, the air flow interior of the meter can be explained.

Dehumidified air typically enters through orifice 24 interiorly to the lower cylindrical portion 20 of the flow meter. Air communicates upwardly to the cylindrical interior and passes through plate 23 at apertures 53 (it being noted that one aperture 54 also provides for the penetration of the neutral density wedge).

Referring to FIG. 4, air then enters into the top of the closed cylinder 42 and passes downwardly into the interior of the cylinder. It reverses flow at the lower portion of open cylinder 49 and passes upwardly and out of cylinder 49 at concentric aperture 46.

Having described this flow pattern, the function of cylinder 49 in cooperation with the gasket 33 and its opposed coil spring 51 can now be described. It will be noted that cylinder 49 has an outside diameter less than the inside diameter of the closed cylinder 42. This is because the interstitial area between the two cylinders is required for downward gas flow.

Moreover, it will be noted that centering cross 45 has an external diameter which is slightly less than the internal diameter of cylinder 49. Thus, when cylinder 49 moves upwardly or downwardly, it will do so in centered relation to the closed cylinder 42.

It can just as plainly be seen that the preferably conical shape of tapered shaft 44 will define a smaller or a greater area at the lower end of cylinder 49. If, for example, full penetration of cylinder 49 interior of the closed cylinder 42 occurs, a minimum orifice area or even orifice closure will result. Conversely, if cylinder 49 is almost completely withdrawn from closed cylinder 42, a large area orifice obstructed only by the centering cross 45 will result.

It should be noted at this juncture that the flow meter is capable of being designed to function as a check valve. Assuming air pressure is lost from pump C, full downward motion of cylinder 49 will result in closure of the bottom aperture of the variable area orifice. Prevention of air flow from interior of cable sheath 14 toward pump C will result.

Diaphragm 33 and spring 51 provide for the variable penetration of the cylinder 49. Where a relatively high volume flow occurs through the meter, diaphragm 33 expands upwardly. This upward expansion draws cylinder 49 correspondingly upward. A large flow area to accommodate large meter flow results.

Conversely, where air flow is reduced, downward flexure of diaphragm 33 urged by spring 51 results. Penetration of cylinder 49 interior of the closed cylinder 42 results in a small flow area with correspondent small flow through the meter.

Thus, the diaphragm and the variable area of the orifice cooperate with each other. High flow generates expanding pressure on the diaphragm with correspondent high aperture flow area. Low flow reduces and collapses the diaphragm with correspondent low flow meter area.

Having set forth the function of the variable orifice flow meter apparatus 40, the operation of the neutral density wedge apparatus 50 can be described.

Specifically, diaphragm 33 includes at its central portion a small bracket 55 having a neutral density wedge 57 attached thereto. Typically, the neutral density wedge 57 extends vertically downward from bracket 59 through the aperture 54 in plate 23. This neutral density wedge extends into an interval between a light source 60 (which is typically a light-emitting diode) and a photo sensor 62 (which is typically a photo resistive element).

Referring to the graph of FIG. 6, the construction of the neutral density wedge can be illustrated. The wedge typically is provided with an active penetration over the flexure of the diaphragm 33 of approximately 1.2 inches. The wedge itself is typically constructed of photographic film having a variable light transmissive property. This film of strip 57 becomes increasingly opaque with increasing penetration of strip 57 downwardly between light source 60 and photo sensor 62. FIG. 6 is an empirical plot of the increasing filtration of light upon increasing penetration of the neutral density wedge 57 between the light source 60 and the photo sensor 62.

It has been previously emphasized that the neutral density wedge 57 is a convenient mechanism to linearize all the irregularities which may be contained within the flow meter configuration. By the expedient of measuring with other metering apparatus the flow through a typical sample of flow meters of this invention, and thereafter tailoring the density of the neutral density wedge along an empirically determined curve such as shown in FIG. 6, virtually all resultant non-linearities of meter flow can be linearized so that the resultant output at photo sensor 62 is linear with respect to changing flow.

In less exacting applications, a completely passive low friction linear motion potentiometer may be substituted for the light-emitting diode 60, photocell 62 and power supply assembly. The potentiometer would be driven directly from the diaphragm assembly resulting in a flow meter possessing the advantages of being less complex and completely passive, but possessing the disadvantage of being less precise due to increased friction. The resistance versus displacement function of the potentiometer may be tailored to compensate for various non-linearities much in the same manner as the neutral density wedge may now be tailored.

The function of the electronic circuitry useful for both powering and detecting the changing flow through the meter of this invention can be easily understood with respect to FIG. 5. Assuming that remote dialing equipment B is placed intermediately of the meter mounted electronic circuitry 70, and the telephone office mounted circuitry 90, sampling of the meter can occur. Specifically, remote dialing equipment B connects power source 91 through a transformer primary 92 and secondary 93 across sampling conduits 71, 72. By supplying an alternating current source across meter transformer primary 73, meter transformer secondary 74 is excited to illuminate the light source 60. Similarly, and on the photo sensor 62 side of the neutral density wedge 57, the alternating current path is by-passed at a capacitor shunt 75. The result is that the overall resistivity of the circuit can be measured across a corresponding capacitor shunt 95 at readout 96 powered by a direct current power source 97.

Thus, it is apparent that through connection across the single conduit 71, 72, both powering and metering of the penetration of the neutral density wedge 57 between the light source 60 and the photo sensor 62 can occur.

Typically, the alternating current voltage transmitted to the conduits 71, 72 is in the range of 80 volts (RMS) dropping to 40 volts (RMS) dependent upon the length of the cable run. When the meter registers high flow, a correspondent low impedance in the range of 100,000 ohms is registered at photoconductor 62. When the meter registers low flow, a higher impedance is registered which is tailored, either by the neutral density wedge, or other resistance used by the device.

It should be noted that the most likely malfunctions (a short circuit) produce an indication of high flow. Moreover, where insulation breaks down between the two conduits 71, 72, an impedance far lower than the 100,000 ohm level will result as a telltale of this type of malfunction event.

It should be understood that the invention herein disclosed will admit of modification. For example, the pressure transducers K and L shown in FIG. 1 can be modified as to their intermediate location between manifolds and at the respective ends of cable runs. Moreover, while the particular variable area orifice herein illustrated is preferred, other orifice arrangements can be utilized. Likewise, the shape and configuration of the meter parts all preferably herein illustrated, can be changed.

We claim:

1. Apparatus for remotely monitoring air flow at a central station to the interior of a remotely located cable sheath surrounding a plurality of communication conduits, said apparatus comprising: a source of dehumidified air; an air conduit between said source of dehumidified air and the interior of said cable sheath for supplying dehumidified air to the interior of said sheath, a flow meter inserted in said air conduit proximate said sheath for passing at least part of the air there through to said sheath, said flow meter including a housing having an inlet for receiving at least part of said air, an outlet for discharging at least part of said air, and a biased diaphragm mounted for movement with respect to said housing responsive to changes in flow of said dehumidified air from said conduit to said cable sheath, means for defining an aperture in said diaphragm, a tapered member mounted to said housing and coacting with said aperture for defining changing air flow areas between said inlet and outlet upon changing concentric movement of said aperture over said tapered member responsive to changes in fluid flow between said inlet and outlet; a member having variable optical density within said meter operatively attached to said diaphragm for relative movement to said meter with said diaphragm responsive to fluid flow; a light source in said flow meter on one side of said member of variable optical density; a photo sensor on the other side of said member of variable optical density for receiving from said light source a signal proportional to the diaphragm actuated movement of said member of variable optical density; at least a pair of electrical conduits extending between said central station and said flow meter; means for remotely monitoring and powering said light source and photo sensor through said pair of electrical conduits; means for connecting said photo sensor across said pair of electrical conduits to impart between said conduits said signal proportional to the diaphragm actuated movement of said member of variable optical density; and meter means at said central power station connected across said electrical conduits for reading said proportional signal.

* * * * *